US011594119B2

(12) United States Patent
Le et al.

(10) Patent No.: US 11,594,119 B2
(45) Date of Patent: Feb. 28, 2023

(54) SYSTEM AND METHOD FOR PROVIDING A CONNECTION STATUS OF A BATTERY POWERED END POINT DEVICE

(71) Applicant: Zurn Industries, LLC, Milwaukee, WI (US)

(72) Inventors: Long L. Le, Morrisville, NC (US); Keith C. Mercer, Raleigh, NC (US); Adesola Adesope, Burlington, NC (US); Vipresh B. Jain, Cary, NC (US); Arindam Chakraborty, Milwaukee, WI (US)

(73) Assignee: Zurn Industries, LLC, Milwaukee, WI (US)

(*) Notice: Subject to any disclaimer, the term of this patent is extended or adjusted under 35 U.S.C. 154(b) by 0 days.

(21) Appl. No.: 17/326,739

(22) Filed: May 21, 2021

(65) Prior Publication Data
US 2022/0375322 A1    Nov. 24, 2022

(51) Int. Cl.
*G08B 21/18*    (2006.01)
(52) U.S. Cl.
CPC .................................... *G08B 21/18* (2013.01)
(58) Field of Classification Search
CPC ...................................................... G08B 21/18
See application file for complete search history.

(56) References Cited

U.S. PATENT DOCUMENTS

| 4,563,780 | A | 1/1986 | Pollack |
| 4,805,247 | A | 2/1989 | Laverty, Jr. |
| 5,175,892 | A | 1/1993 | Shaw |
| 5,217,035 | A | 6/1993 | Van Marcke |
| 5,438,714 | A | 8/1995 | Shaw |
| 5,612,890 | A | 3/1997 | Strasser et al. |

(Continued)

FOREIGN PATENT DOCUMENTS

| CN | 208922102 U | * 5/2019 | ........... G05B 19/052 |
| JP | 2002021149 A | 1/2002 | |

(Continued)

OTHER PUBLICATIONS

Claude A. Wiatrowski "Microprocessor Restroom Robot," Computer Design The Magazine of Digital Electronics, Apr. 1977, pp. 98-100, (3 pages).

(Continued)

*Primary Examiner* — Brian Wilson
(74) *Attorney, Agent, or Firm* — Michael Best & Friedrich LLP

(57) ABSTRACT

Methods and systems of providing a connection status of a battery powered end point device. One system includes an end point device associated with a facility. The end point device including a housing including a receiving portion and a lid portion and a boss protruding from an inner surface of the lid portion. The end point device also includes a switch associated with the receiving portion of the housing and an electronic processor communicatively coupled to the switch. The electronic processor is configured to monitor a current position of the switch. The electronic processor is also configured to, in response to determining that the current position of the switch is opened, determine a status of the end point device and provide a visual indication of the status of the end point device.

12 Claims, 7 Drawing Sheets

(56) References Cited

U.S. PATENT DOCUMENTS

| | | | |
|---|---|---|---|
| 5,655,961 | A | 8/1997 | Acres et al. |
| 5,838,258 | A | 11/1998 | Saar |
| 5,844,808 | A | 12/1998 | Konsmo et al. |
| 6,018,827 | A | 2/2000 | Shaw et al. |
| 6,038,519 | A | 3/2000 | Gauthier et al. |
| 6,189,163 | B1 | 2/2001 | Van Marcke |
| 6,236,953 | B1 | 5/2001 | Segal |
| 6,337,635 | B1 | 1/2002 | Ericksen et al. |
| 6,347,414 | B2 | 2/2002 | Contadini et al. |
| 6,411,920 | B1 | 6/2002 | McConnell et al. |
| 6,583,720 | B1 | 6/2003 | Quigley |
| 6,691,724 | B2 | 2/2004 | Ford |
| 6,694,177 | B2 | 2/2004 | Eggers et al. |
| 6,701,194 | B2 | 3/2004 | Gauthier et al. |
| 6,749,122 | B1 | 6/2004 | Koenck et al. |
| 6,766,221 | B1 | 7/2004 | Christiansen |
| 6,769,443 | B2 | 8/2004 | Bush |
| 6,802,084 | B2 | 10/2004 | Ghertner et al. |
| 6,853,958 | B1 | 2/2005 | Turin et al. |
| 6,854,053 | B2 | 2/2005 | Burkhardt et al. |
| 6,892,746 | B2 | 5/2005 | Ford |
| 6,956,498 | B1 | 10/2005 | Gauthier et al. |
| 6,967,565 | B2 | 11/2005 | Lingemann |
| 7,023,341 | B2 | 4/2006 | Stilp |
| 7,053,767 | B2 | 5/2006 | Petite et al. |
| 7,058,457 | B2 | 6/2006 | Kuwahara et al. |
| 7,119,658 | B2 | 10/2006 | Stilp |
| 7,143,007 | B2 | 11/2006 | Long et al. |
| 7,177,725 | B2 | 2/2007 | Nortier et al. |
| 7,222,111 | B1 | 5/2007 | Budike, Jr. |
| 7,304,569 | B2 | 12/2007 | Marcichow |
| 7,360,413 | B2 | 4/2008 | Jeffries et al. |
| 7,814,582 | B2 | 10/2010 | Reddy et al. |
| 8,028,355 | B2 | 10/2011 | Reeder et al. |
| 8,364,546 | B2 | 1/2013 | Yenni et al. |
| 9,169,625 | B2 | 10/2015 | Chiu et al. |
| 9,266,136 | B2 | 2/2016 | Klicpera |
| 9,429,453 | B1 | 8/2016 | O'Keeffe et al. |
| 9,830,565 | B2 | 11/2017 | O'Toole |
| 9,939,299 | B2 | 4/2018 | Patel et al. |
| 9,963,863 | B2 | 5/2018 | Allard, III |
| 10,264,588 | B2 | 4/2019 | Wegelin et al. |
| 10,329,744 | B2 | 6/2019 | Abdel-Fattah et al. |
| 10,361,802 | B1 | 7/2019 | Hoffberg-Borghesani et al. |
| 10,430,737 | B2 | 10/2019 | Yenni et al. |
| 10,504,355 | B2 | 12/2019 | Wegelin et al. |
| 10,514,110 | B2 | 12/2019 | Allard, III |
| 10,527,191 | B2 | 1/2020 | Bush et al. |
| 10,529,167 | B2 | 1/2020 | Khamphilapanyo et al. |
| 10,529,219 | B2 | 1/2020 | Herdt et al. |
| 10,532,920 | B2 | 1/2020 | Slater et al. |
| 10,655,967 | B2 | 5/2020 | Wegelin et al. |
| 10,687,340 | B2 | 6/2020 | Wegelin et al. |
| 11,108,865 | B1 | 8/2021 | Chakraborty et al. |
| 2002/0099454 | A1 | 7/2002 | Gerrity |
| 2002/0190868 | A1* | 12/2002 | Dearborn ............... G06F 11/326 361/600 |
| 2006/0208862 | A1* | 9/2006 | Lahr ....................... B60Q 9/00 340/433 |
| 2010/0164736 | A1* | 7/2010 | Byers ..................... H04L 12/12 340/657 |
| 2014/0249854 | A1 | 9/2014 | Moore et al. |
| 2016/0258144 | A1 | 9/2016 | Tayenaka et al. |
| 2017/0038224 | A1 | 2/2017 | O'Keeffe et al. |
| 2017/0129383 | A1* | 5/2017 | Bika ....................... G01L 5/047 |
| 2017/0223807 | A1 | 9/2017 | Recker et al. |
| 2018/0198639 | A1 | 7/2018 | Ishizaka |
| 2018/0354777 | A1 | 12/2018 | Slater et al. |
| 2019/0001863 | A1* | 1/2019 | Taylor ..................... G01L 5/101 |
| 2019/0351442 | A1 | 11/2019 | McNulty et al. |
| 2019/0353278 | A1 | 11/2019 | Bush et al. |
| 2019/0354535 | A1 | 11/2019 | Amin et al. |
| 2019/0359477 | A1 | 11/2019 | Wegelin et al. |
| 2019/0360184 | A1 | 11/2019 | Lawinger |
| 2019/0362617 | A1 | 11/2019 | Bonner et al. |
| 2020/0097030 | A1 | 3/2020 | Carlson |
| 2020/0098199 | A1 | 3/2020 | Bullock |
| 2020/0099679 | A1 | 3/2020 | Carlson |
| 2020/0140254 | A1 | 5/2020 | Slater et al. |
| 2020/0141773 | A1 | 5/2020 | Burke et al. |
| 2020/0145257 | A1 | 5/2020 | Samudrala |
| 2020/0232832 | A1 | 7/2020 | Burke et al. |
| 2020/0253187 | A1* | 8/2020 | Files ....................... A01M 19/00 |
| 2020/0314866 | A1 | 10/2020 | Wegelin et al. |
| 2020/0358852 | A1 | 11/2020 | Burke et al. |
| 2020/0404357 | A1 | 12/2020 | Kulkarni et al. |
| 2021/0144210 | A1 | 5/2021 | Kohapure et al. |
| 2021/0225159 | A1* | 7/2021 | Grobelny .............. G06F 9/4401 |
| 2021/0376587 | A1* | 12/2021 | Martin ................... H01R 27/02 |

FOREIGN PATENT DOCUMENTS

| | | |
|---|---|---|
| WO | WO1996041058 A1 | 12/1996 |
| WO | WO2002056540 A2 | 7/2002 |

OTHER PUBLICATIONS

Lighting Answers, "Controlling Lighting with Building Automation Systems," vol. 4, No. 1, May 1997, <https://www.lightingassociates.org/i/u/2127806/f/tech_sheets/Lighting_Control.pdf>, (8 pages).

Yuri-May L. Chang and James Y. Shih, "Microprocessor Applications and Building Control Systems to Achieve Energy Conservation," U.S. Department of Commerce and National Bureau of Standards, Jul. 1980, <https://www.govinfo.gov/content/pkg/GOVPUB-C13-e5481618eda4a471a0aab647d520b129/pdf/GOVPUB-C13-e5481618eda4a471a0aab647d520b129.pdf>, (54 pages).

Johnson Controls, "Metasys® for Validated Environments (MVE)," Product Bulletin, Dec. 15, 2001, (13 pages).

GE, "Lightsweep Lighing Control System," Product Literature, Dec. 8, 2015, (12 Pages).

Trane, "Tracer™ SC System Controller for Tracer Building Automated Systems," Product Catalog, P/N BAS-PRC031-EH, Jun. 10, 2013, (27 Pages).

Lutron, "Quantum Unlimited Capability for High-Performance Buildings," Product Literature, P/N 367-1321, Apr. 2018, (20 Pages).

AcuityControls, "SensorView Manual," Nov. 3, 2015, (123 Pages).

AcuityControls, "nLight Network Lighting Control," Copyright 2014, (78 Pages).

Lutron, "What is Lighting Control System", Product Literature 366-396h, Publicly available prior to Nov. 19, 2020, (19 Pages).

* cited by examiner

SYSTEM AND METHOD FOR PROVIDING A CONNECTION STATUS OF A BATTERY POWERED END POINT DEVICE

FIELD

Embodiments relate to visually providing a status of a battery powered end point device, and, more particularly, to visually identifying a connection status of the battery powered end point device for internet-of-things ("IoT") applications without draining battery energy during normal operating conditions.

SUMMARY

In the field of facility or building management, there is a desire to monitor performance of various water management solutions, such as, for example, faucets, flush valves, resource dispensers (for example, a soap dispenser), and the like. As one example, a facility manager may want to monitor water usage or consumption for one or more restroom facilities. Such monitoring may be performed for predictive maintenance, alerting, or the like. For example, monitoring may indicate that there is a certain percentage of life remaining for a flush valve based on a rated life of flushes and a number of flush operations performed by the flush valve. As another example, monitoring may generate alerts, such as a low soap alert, a backflow discharge in progress alert, a drain clogged alert, and the like. However, these applications are typically in locations that are not serviced by main power, are difficult to reach, and are limited in size, which, ultimately, limits the size of batteries that may be used. Therefore, there is a need for a battery-powered solution that provides a low power consumption solution while also accommodating the limited size constraints. Additionally, there is a need for a battery-powered solution that visually provides a status of a battery powered end point device, such as, for example, for identifying a connection status of the battery powered end point device for IoT applications without draining battery energy during normal operating conditions.

Accordingly, the embodiments described herein provide methods and systems for visually providing a status of a battery powered end point device. Embodiments described herein enables a low power consumption solution for visually providing a status of a battery powered end point device (for example, a connection status between a wireless network and the battery powered end point device). Embodiments described herein enable user(s) to visually identify if a battery powered end point device (for example, an IoT device) is connected to a wireless network by flashing or illuminating LED lights without draining a battery source (during normal operation), without advanced peripherals, such as a computing device or other diagnostic instruments, and the like. As one example, a user may quickly determine whether the end point device is operational after a battery installation, device servicing or maintenance, or the like. Accordingly, the embodiments described herein visually provide a status (or connection status) of a battery powered end point device while also conserving energy or power consumption.

Other aspects and embodiments will become apparent by consideration of the detailed description and accompanying drawings.

DETAILED DESCRIPTION

Before any embodiments are explained in detail, it is to be understood the embodiments are not limited in their application to the details of construction and the arrangement of components set forth in the following description or illustrated in the following drawings. Other embodiments are possible and embodiments described and/or illustrated here are capable of being practiced or of being carried out in various ways.

It should also be noted that a plurality of hardware and software-based devices, as well as a plurality of different structural components may be used to implement the embodiments described herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
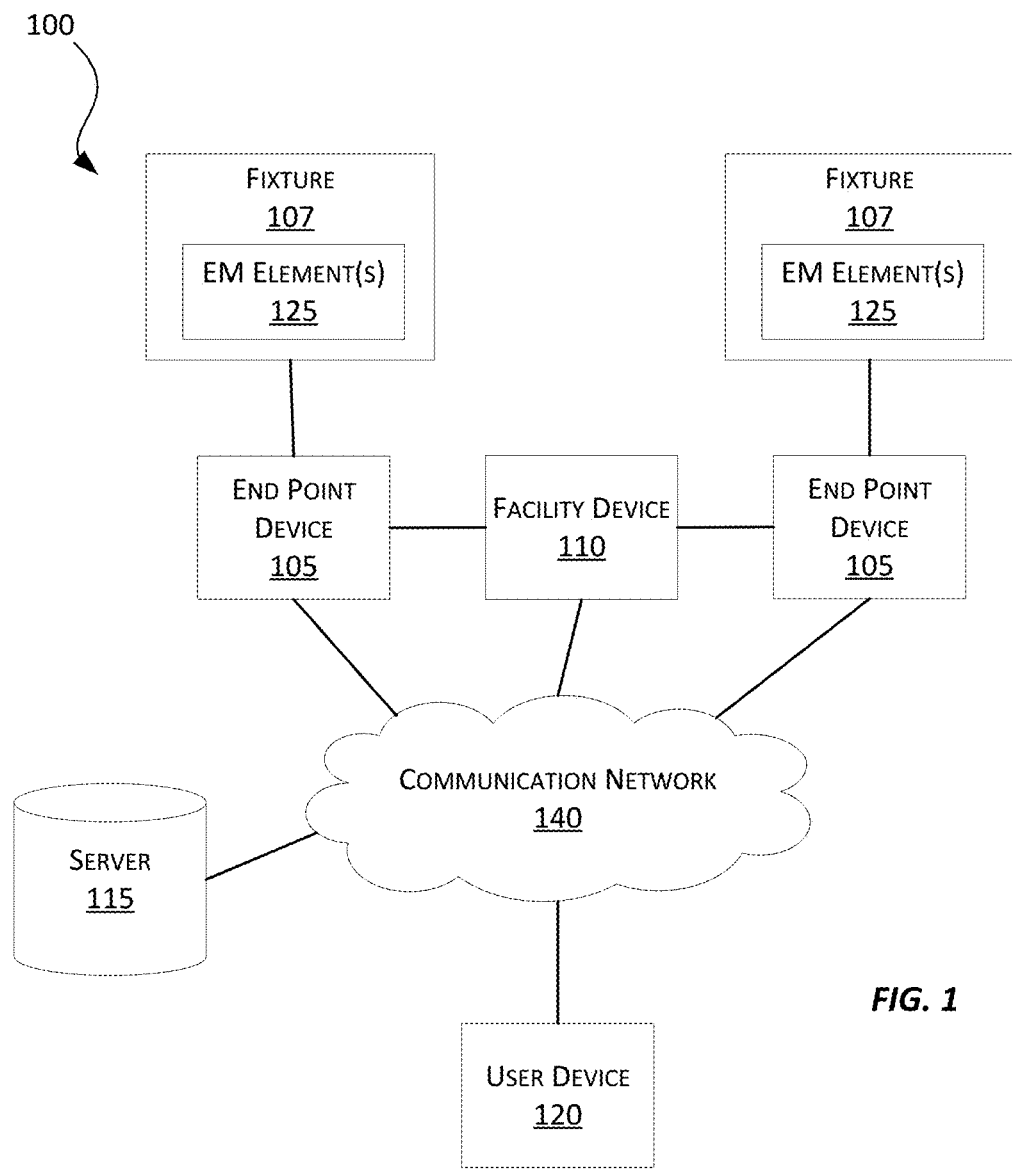
FIG. 1 schematically illustrates a system for providing a status of a battery powered end point device according to some embodiments.

FIG. 1 illustrates a system 100 for providing a status of a battery powered end point device of a facility (for example, a building or one or more rooms within a building) according to some embodiments. In the illustrated example, the system 100 includes one or more end point devices 105 (collectively referred to herein as "the end point devices 105" and individually as "the end point device 105"), one or more fixtures 107 (collectively referred to herein as "the fixtures 107" and individually as "the fixture 107"), a facility device 110 (for example, a gateway), a server 115 (for example, a cloud server), and a user device 120. In some embodiments, the system 100 includes fewer, additional, or different components than illustrated in FIG. 1 in various configurations. For example, the system 100 may include multiple facility devices 110, servers, 115, user devices 120, or a combination thereof. Additionally, the system 100 may include any number of end point devices 105 and/or fixtures 107 and the two end point devices and fixtures illustrated in FIG. 1 are purely for illustrative purposes. Also, in some embodiments, one or more of the components of the system 100 may be distributed among multiple devices, combined within a single device, or a combination thereof. As one example, in some embodiments, one or more of the end point devices 105 may be incorporated within the fixture 107 as a single device. Accordingly, in some embodiments, the functionality described as being performed by the end point device 105 (or a portion thereof) may be performed by the fixture 107 (including built-in or attached similar hardware and software components as the end point device 105).

The end point devices 105, the fixtures 107, the facility device 110, the server 115, and the user device 120 communicate over one or more wired or wireless communication networks 140. Portions of the communication networks 140 may be implemented using a wide area network ("WAN"), such as the Internet or a LoRa system, a local area network ("LAN"), such as a Bluetooth™ network or Wi-Fi, and combinations or derivatives thereof. Accordingly, components of the system 100 may be configured to communicate via Bluetooth, Wi-Fi, Zigbee, LTE/Cellular, wired ethernet, RS485/RS232, or the like. As one example, the end point devices 105 may communicate via LoRa with the facility device 110. Alternatively or in addition, in some embodiments, one or more components of the system 100 communicate directly as compared to through the communication network 140. For example, in some embodiments, the end point devices 105 communicate directly with the facility device 110. Also, in some embodiments, the components of the system 100 communicate through one or more intermediary devices not illustrated in FIG. 1.

Additionally, in some embodiments, one or more components of the system 100 communicate using LoRa or LoRaWAN networking protocols (for example, the end point device 105 and the facility device 110). Using such networking protocols provides for secure, encrypted communication of data without use of a customer or building network. Accordingly, use of such networking protocols may completely isolate the end point device 105 (or other component of the system 100) from a customer or building network.

The fixture 107 may include, for example, a faucet, a flushometer, a flush valve, a soap dispenser, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain, a drinking water fountain, an air or room quality sensor (for example, may include a service request or product replenishment request button or other suitable activator), a backflow preventer, a leak detection sensor, an occupancy detection sensor, and a resource dispenser (for example, a soap dispenser, a sanitizer dispenser, a room deodorizer dispenser, a paper tower dispenser), and the like. Accordingly, in some embodiments, the fixture 107 provides a water management solution. As seen in FIG. 1, each of the fixtures 107 is associated with one or more electro-mechanical ("EM") elements 125 (collectively referred to herein as "the EM elements 125" and individually as "the EM element 125). The EM elements 125 are configured to monitor and/or influence the operation of the fixture 107. An EM element 125 may include, but is not limited to, an actuator, a flow sensor, a position sensor, a proximity sensor, a thermocouple, and the like. It is contemplated that the EM elements 125 may include an electrical only element, a mechanical only element, or a combination of an electrical and a mechanical element(s). The EM elements 125 may include a single-piece component or multiple components.

As one example, in some embodiments, the fixture 107 is a faucet having a sensor (for example, as a first EM element 125) configured to detect the presence of a person within a specified zone. When the sensor is triggered (for example, by detecting the presence of a person), the sensor sends an "ON" signal to an actuator (as a second EM element 125) (for example, a valve actuating solenoid) thereby allowing water to selectively flow through the faucet. When the sensor is no longer triggered (for example, by detecting the absence of a person), the sensor sends an "OFF" signal to the actuator to stop water flow through the faucet. In some embodiments, the actuator is configured to maintain the faucet in an open position for a predetermined period of time in response to receiving an "ON" signal. In such embodiments, the predetermined period of time may be set by a user or facility entity via, for example, the facility device 110, the user device 120, another component of the system 100, or a combination thereof.

As another example, in some embodiments, the fixture 107 is a flush valve having a sensor (for example, as a first EM element 125) configured to detect the presence of a person within a specified zone. When the sensor is triggered (for example, by detecting the presence of a person), the sensor sends an "ON" signal to the actuator (as a second EM element 125) (for example, a valve actuating solenoid) to actuate a valve and initiate a flow of water for a flushing event. The flush valve will then remain open for a predetermined period of time (for example, 5 seconds, 10 seconds, and the like) at least partially dependent upon an operating parameter set by the user via, for example, the facility device 110, the user device 120, another component of the system 100, or a combination thereof As yet another example, in some embodiments, the fixture 107 is a resource dispenser (such as a soap dispenser, a hand towel dispenser, and the like) having a sensor (for example, as a first EM element 125) configured to detect the presence of a person within a specified zone. When the sensor is triggered (for example, by the hands of a person), the sensor sends an "ON" signal to an actuator (for example, as a second EM element 125) to trigger a resource dispensing event (for example, actuation of a gear, a valve, or solenoid, and the like to initiate dispensing of a resource). The resource dispenser is configured to allow a predetermined volume or amount of a resource to be dispensed for each activation. In such embodiments, the volume or amount or timing of a resource to be dispensed may be set and adjusted by the user via, for example, the facility device 110, the user device 120, another component of the system 100, or a combination thereof.

The resource dispenser may also include a second sensor (for example, as a third EM element 125) to monitor the level or amount of resource remaining in a reservoir or receptacle. In some embodiments, the second sensor detects a current level or amount of resource in the reservoir or receptacle at a given moment in time. Alternatively or in addition, the second sensor may detect when the resource falls below a predetermined amount or level.

As yet another example, in some embodiments, the fixture 107 is a water service line monitor. The water service line monitor includes a sensor (for example, as a first EM element 125) configured to be retrofit onto an existing water service line and is configured to monitor the flow-rate of water therethrough, the presence of a backflow event, or a combination thereof. More specifically, the sensor may be configured to detect a flow rate, a presence of a backflow event, and the like.

As seen in FIG. 1, the end point device 105 generally includes a communication link with at least one fixture 107. The end point devices 105 may span multiple facilities, locations, rooms, and the like. In some embodiments, each of the end point devices 105 is associated with (located within) the same facility (for example, a restroom facility). However, in other embodiments, the end point devices 105 are associated with multiple facilities. As one example, a first end point device may be associated with a first facility, and a second end point device may be associated with a second different facility that is either in the same building as the first facility or in an entirely different building. Alternatively or in addition, in some embodiments, each of the end point devices 105 is associated with the same type of restroom fixture (for example, the fixture 107). However, in other embodiments, the end point devices 105 are associated with multiple different types of restroom fixtures (for example, the fixture 107). As one example, a first end point device may be associated with a faucet (as a first fixture 107) and a second end point device may be associated with a soap dispenser (as a second fixture 107).

Figure 2:
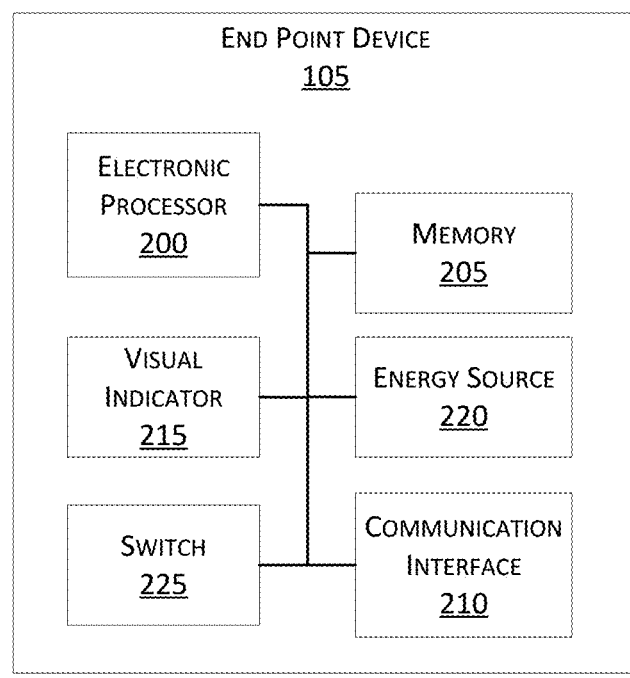
FIG. 2 schematically illustrates an end point device included in the system of FIG. 1 according to some embodiments.

FIG. 2 schematically illustrates an end point device 105 according to some embodiments. In the illustrated example, the end point device 105 includes an electronic processor 200, a memory 205, a communication interface 210, a visual indicator 215, an energy source 220, and a switch 225. The electronic processor 200, the memory 205, the communication interface 210, the visual indicator 215, the energy source 220, and the switch 225 communicate wirelessly, over one or more communication lines or buses, or a combination thereof. In some embodiments, one or more components of the end point device 105 may be distributed among multiple devices, integrated into a single device, or a combination thereof. In some embodiments, the end point device 105 may perform additional functionality other than the functionality described herein. In some embodiments, the end point device 105 may include additional, different, or fewer components than those illustrated in FIG. 2 in various configurations. As one example, in some embodiments, the end point device 105 includes multiple visual indicators 215, energy sources 220, switches 225, or a combination thereof. As another example, in some embodiments, the end point device 105 includes one or more expansion ports allowing for future expansion of the end point device 105. As one example, additional EM elements of a fixture 107 may be connected to the end point device 105 via the one or more of the expansion ports.

The communication interface 210 allows the end point device 105 to communicate with devices external to the end point device 105. For example, as illustrated in FIG. 1, the end point device 105 may communicate with the fixture 107 (or an EM element 125 thereof), the facility device 110, the server 115, the user device 120, or a combination thereof through the communication interface 210. The communication interface 210 may include a port for receiving a wired connection to an external device (for example, a universal serial bus ("USB") cable and the like), a transceiver for establishing a wireless connection to an external device (for example, over one or more communication networks 140, such as the Internet, LAN, a WAN, such as a LoRa network or system, and the like), or a combination thereof. As one example, in some embodiments, the communication interface 210 includes a port for receiving a wired connection between the facility device 110 and an EM element 125 of the corresponding fixture 107. As another example, in some embodiments, the communication interface 210 includes a radio or transceiver for establishing a wireless connection, over a LoRa system or network, between the end point device 105 and the facility device 110.

The electronic processor 200 includes a microprocessor, an application-specific integrated circuit ("ASIC"), or another suitable electronic device for processing data, and the memory 205 includes a non-transitory, computer-readable storage medium. The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein. For example, in some embodiments, the electronic processor 200 is configured to determine (or monitor) a status of the end point device 105 and provide a visual indication of the status. A status of the end point device 105 may include, for example, a connection status, an operational status, or another status associated with a component of the system 100 (for example, the battery powered end point device). A connection status may refer to, for example, the connection status between a wireless network and the battery powered end point device. An operational status may refer to, for example, the operational status of the battery powered end point device, the fixture 107, or another component of the system 100. As one example, the operational status may indicate a health or communication status of electronics associated with a fixture 107 (for example, via establishing communication through analog or digital interfaces). In some embodiments, the electronic processor 200 monitors a position of the switch 225 and determines the status and provides a visual indication of the status based on the position of the switch 225.

Alternatively or in addition, in some embodiments, the electronic processor 200 is configured to enable management and/or monitoring of the operation of the corresponding fixture 107 either directly or indirectly (for example, via the EM element(s) 125 of the corresponding fixture 107). In some embodiments, the electronic processor 200 enables management and/or monitoring of the operation of a corresponding fixture 107 by receiving fixture data from the fixtures 107, converting the fixture data for transmission, and enabling transmission of the converted data to, for example, the facility device 110, the server 115, the user device 120, another component of the system 100, or a combination thereof. Accordingly, in some embodiments, the electronic processor 200 is configured to interact with and collect data regarding an operation of a fixture 107 (as fixture data) via the EM elements 215 either directly or indirectly. In some embodiments, the end point device 105 is configured to remain in a sleep mode (or deep sleep mode) until an action or operation is detected with respect to a fixture 107 associated with the end point device 105 (for example, detecting the presence of a user). In response to detecting the action or operation, the end point device 105 may then wake-up to receive fixture data, convert the fixture data for transmission, and transmit the fixture data (in a minimum power consumption mode) to, for example, the facility device 110, the server 115, the user device 120, another component of the system 100, or a combination thereof. This results in optimized battery life for the product.

As seen in FIG. 2, the end point device 105 also includes the visual indicator 215 and the switch 225. The visual indicator 215 is configured to visually provide or indicate a status (for example, a connection status) of the end point device 105. In some embodiments, the visual indicator 215 is an LED light. The visual indicator 215 may indicate a status of the end point device 105 by displaying or otherwise illuminating one or more specific colors. Alternatively or in addition, in some embodiments, the visual indicator 215 flashes one or more specific colors. The visual indicator 215 is configured to provide a status of the end point device 105 based on a position of the switch 225. The switch 225 is a switch that depresses, such as, for example, a push button switch. The switch 225 may be in a depressed position or a non-depressed position. When the switch 225 is in the non-depressed position, the circuitry associated with the switch 225 is activated (for example, a closed circuit). However, when the switch 225 is in the depressed position, the circuitry associated with the switch 225 is not activated (for example, an open circuit). In some embodiments, the circuitry associated with the switch 225 includes one or more of the visual indicators, another component of the end point device 105, or a combination thereof. As noted above, the visual indicator 215 is configured to provide or indicate a status of the end point device 105. Accordingly, in some embodiments, when the switch 225 is activated (i.e., not depressed), the visual indicator 215 may indicate a status of the end point device 105. Alternatively or in addition, in some embodiments, when the switch 225 is not activated (i.e., not depressed), the visual indicator 215 may not indicate a status of the end point device 105.

Alternatively or in addition, in some embodiments, the switch 225 is deployed or designed for multi-purpose presses that are tied to firmware codes for specific functions in the endpoint device. For example, different switch activation intervals may be tied to various failure or diagnostic modes for the end point device 105. Accordingly, in some embodiments, the switch 225 provides additional functionality (for example, controlling an operating mode of the end point device 105) in addition to controlling one or more visual indicators 215 of the end point device 105.

Alternatively or in addition, in some embodiments, the switch 225 functions as an open and close in a power circuit supplying current to the visual indicator 215. Accordingly, the visual indicator 215 is powered based on the position of the switch 225. Alternatively or in addition, in some embodiments, the switch 225 is tied to a hi-low power circuit allowing for detection by the electronic processor 200.

Additionally, as seen in FIG. 2, the end point device 105 also includes the energy source 220. The energy source 220 powers one or more components of the end point device 105, such as the electronic processor 200. The energy source 220 may be a battery, such as an energy efficient battery, a re-chargeable battery, a lithium-ion battery, a replaceable battery, or the like. As one example, the energy source 220 is a standard battery (for example, AAA, AA, C, D sized batteries). As noted above, in some embodiments, the end point device 105 includes multiple energy sources 220 (for example, a first energy source, a second energy source, and the like). In such embodiments, the multiple energy sources 220 may be of the same type, different types, or a combination thereof. As one example, the end point device 105 may include three AA batteries as the energy sources 220.

In some embodiments, one or more components of the system 100 may already be present in a completed fixture 107 (for example, a proximity sensor and an actuator in an automated faucet). In such embodiments, additional components may be retro-fit onto the existing fixture 107. Accordingly, in some embodiments, the end point device 105 (or components thereof) may be retro-fit onto or into the existing fixture 107. As one example, a transmitter, a receiver, a transceiver, or a combination thereof (as part of the communication interface 210), the electronic processor 200, the energy source 220, or a combination thereof may be mounted in the plumbing immediately upstream of a particular fixture 107. In other examples, the retro-fit may include updating firmware in the already existing device. In still other examples, the retro-fit may include integrating elements into a previously existing fixture 107.

Figure 3A:
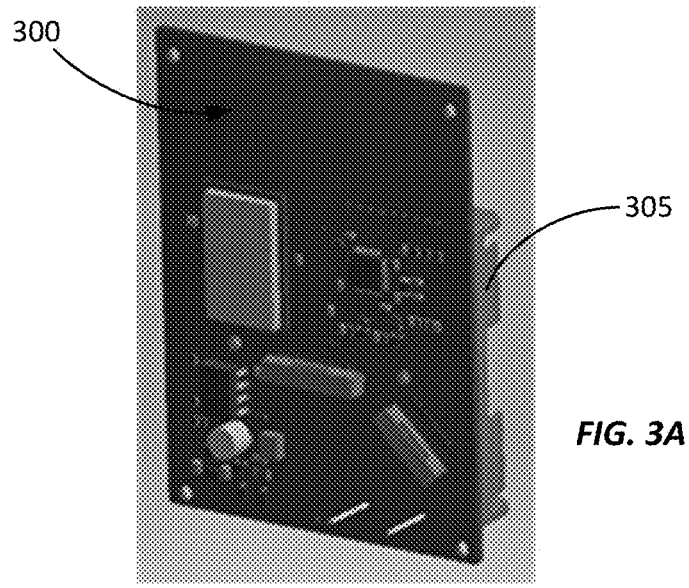
FIGS. 3A-3B illustrate an example printed circuit board for the end point device of FIG. 2 according to some embodiments.
Figure 3B:
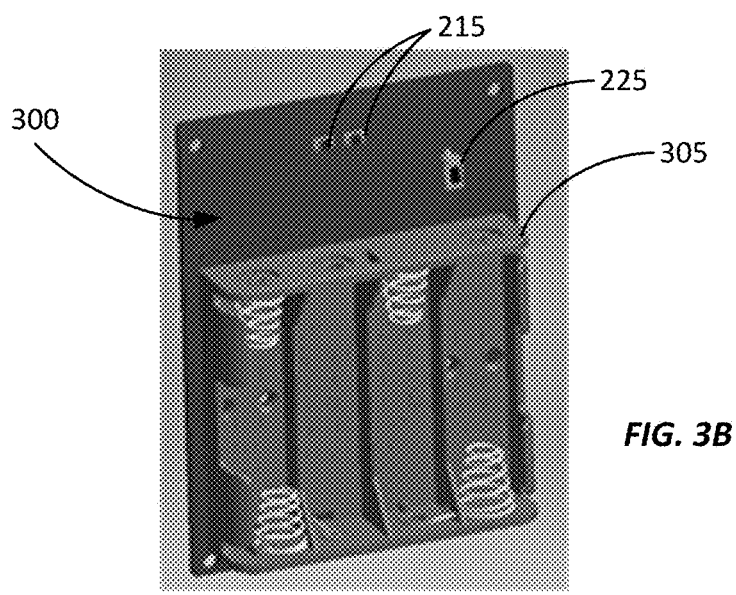

FIGS. 3A-3B illustrate an example printed circuit board 300 for the end point device 105 according to some embodiments. In the illustrated example, the printed circuit board 300 includes two visual indicators 215 (depicted in FIG. 3B as surface mount LEDs), the switch 225, and an energy source holder 305. The energy source holder 305 may be configured to receive one or more energy sources 220. As one example, as illustrated in FIG. 3B, the energy source holder 305 is configured to receive four AA sized batteries (as the energy sources 220).

Figure 4A:
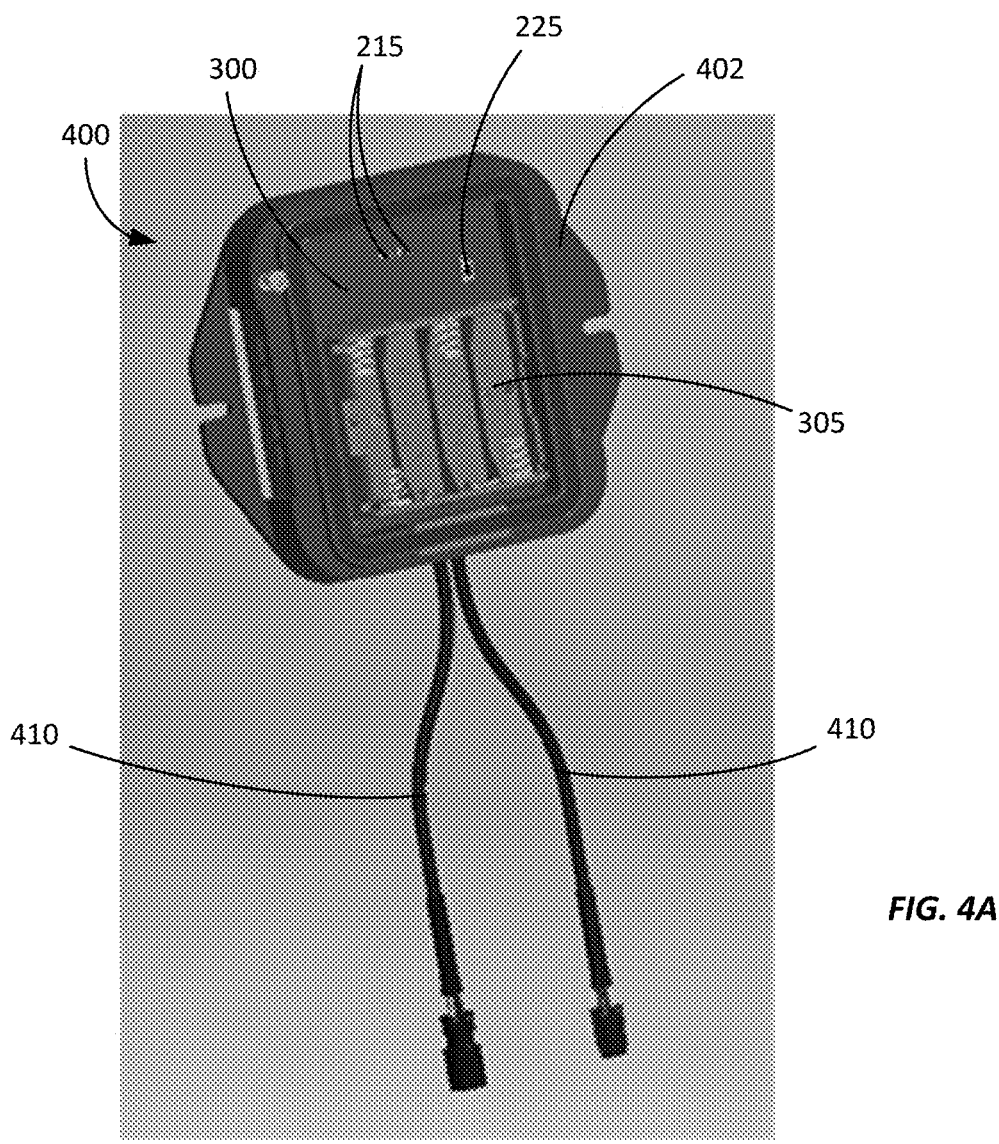
FIGS. 4A-4B illustrate an example electronics housing for the end point device of FIG. 2 according to some embodiments.
Figure 4B:
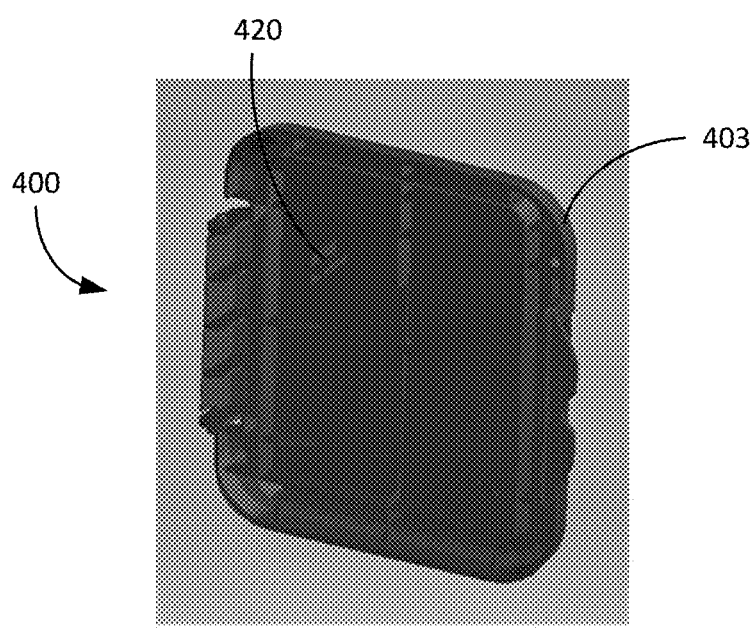

FIGS. 4A-4B illustrate an example electronics housing 400 for the end point device 105 according to some embodiments. FIG. 4A illustrates a receiving portion 402 of the housing 400 and FIG. 4B illustrates a lid portion 403 of the housing 400. The receiving portion 402 and the lid portion 403 are configured to be coupled (or attached) to each other. Accordingly, in some embodiments, the receiving portion 402 and the lid portion 403 form an enclosure.

The housing 400 (or the lid portion 403 thereof) may be in an opened position or a closed position. When the housing 400 is in an opened position, the contents of the housing 400 are exposed (for example, a user may access or see the contents of the housing 400). The housing 400 may be in an opened position when the lid portion 403 is at least partially de-coupled from the receiving portion 402. As one example, the housing 400 may be in an open position when the lid portion 403 is completely de-coupled (or removed) from the receiving portion 402. As another example, the housing 400 may be in an open position when the lid portion 403 is partially de-coupled from the receiving portion 402 (such that at least a portion of the lid portion remains coupled to the receiving portion 402 while another portion of the lid portion is de-coupled from the receiving portion 402). When the housing 400 is in a closed position, the contents of the housing 400 are not exposed (for example, a user may not access or see the contents of the housing 400). The housing 400 may be in a closed position when the lid portion 403 is completely coupled or attached to the receiving portion 402.

As seen in FIGS. 4A, the receiving portion 402 is configured to receive the printed circuit board 300 of FIGS. 3A-3B (for example, one or more electronical components of the end point device 105, such as the electronic processor 200). Accordingly, when the housing 400 in a closed position, the printed circuit board 300 is enclosed within the housing 400 is of the end point device 105. As also seen in FIG. 4A, the end point device 105 may include one or more wires or cables 410 extending from the housing 400. The wires 410 may provide a direct or indirect wired connection to, for example, one or more of the EM elements 125 of the fixture 107 associated with the end point device 105.

Figure 5:
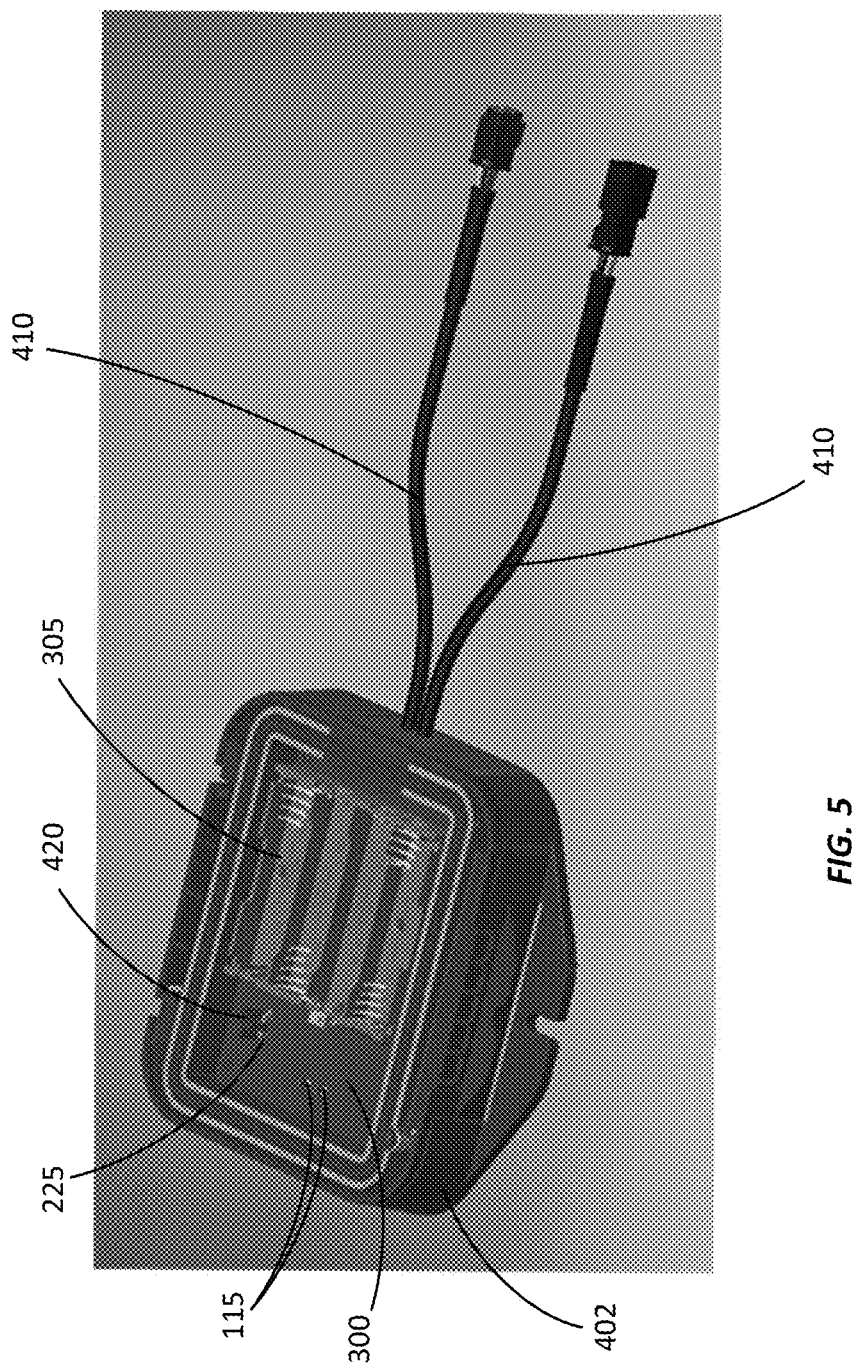
FIG. 5 illustrates an alignment of a boss and a switch of the end point device of FIG. 2 according to some embodiments.

The lid portion 403 allows a user to easily access or see the components enclosed within the housing 400 (for example, to remove and replace one or more of the energy sources 220). As seen in FIG. 4B, the lid portion 403 includes a boss 420 (or another type of mechanical protrusion). In the illustrated example, the boss 420 is positioned on (or protrudes from) an inner surface of the lid portion 403. Accordingly, in some embodiments, the boss 420 protrudes from the inner surface of the lid portion 415 inward towards the printed circuit board 300. The boss 420 is positioned on the inner surface of the lid portion 403 such that the boss 420 is aligned with the switch 225 of the printed circuit board 300. For example, FIG. 5 illustrates the alignment of the boss 420 with the switch 225 of the printed circuit board 300. Accordingly, when the housing 400 is in a closed position, the boss 420 interacts with the switch 225, as seen in FIG. 5. In some embodiments, the boss 420 interacts with the switch 225 by depressing the switch 225. Accordingly, when the housing 400 is in a closed position, the switch 225 is opened or not activated (for example, an open circuit). However, when the housing 400 is in an opened position (such that the boss 420 no longer depresses the switch 225), the switch 225 is closed or activated (for example, a closed circuit).

Returning to FIG. 1, the system 100 also includes the facility device 110. Although not illustrated in FIG. 1, the facility device 110 may include similar components as the end point device 105, such as an electronic processor (for example, a microprocessor, an ASIC, or another suitable electronic device), a memory (for example, a non-transitory, computer-readable storage medium), a communication interface, such as a transceiver, for communicating over the communication network 140 and, optionally, one or more additional communication networks or connections, and one or more human machine interfaces. In some embodiments, one or more components of the facility device 110 may be distributed among multiple devices, integrated into a single device, or a combination thereof. In some embodiments, the facility device 110 may perform additional functionality other than the functionality described herein. Also, the functionality (or a portion thereof) described herein as being performed by the facility device 110 may be distributed among multiple devices.

In some embodiments, the facility device 110 serves as a gateway or intermediary device that receives data (for example, the fixture data) from the electronic processors 200 of one or more of the end point devices 105 and forwards the collected data to another component for processing, such as the server 115, the user device 120, or a combination thereof. For example, in some embodiments, the facility device 110 forwards the data to a remote server (for example, the server 115) for virtual processing. Accordingly, as noted above, in some embodiments, the functionality (or a portion thereof) described as being performed by the facility device 110 may be performed by another remote device or server (not shown).

The system also includes the server 115 and the user device 120. The server 115 and the user device 120 are computing devices, such as a desktop computer, a laptop computer, a tablet computer, a terminal, a smart telephone, a smart television, a smart wearable, or another suitable computing device that interfaces with a user. Although not illustrated in FIG. 1, the server 115 and the user device 120 may include similar components as the end point device 105, such as an electronic processor (for example, a microprocessor, an ASIC, or another suitable electronic device), a memory (for example, a non-transitory, computer-readable storage medium), a communication interface, such as a transceiver, for communicating over the communication network 140 and, optionally, one or more additional communication networks or connections, and one or more human machine interfaces.

In some embodiments, the server 115 may include multiple electronic processors, multiple memory modules, multiple communication interfaces, or a combination thereof. Also, it should be understood that the functionality described herein as being performed by the server 115 may be performed in a distributed nature by a plurality of computers located in various geographic locations. For example, the functionality described herein as being performed by the server 115 may be performed by a plurality of computers included in a cloud computing environment.

The server 115 is configured to monitor and manage one or more facilities (e.g., individual restrooms or entire buildings), including the fixtures 107 therein. In some embodiments, the server 115 (via an electronic processor of the server 115) may receive fixture data from the facility device 110. In response to receiving the fixture data, the server 115 may process the fixture data in order to determine usage information or patterns associated with the one or more facilities, including the fixtures 107 thereof. The server 115 may store the usage information or patterns in, for example, a memory of the server 115. Alternatively or in addition, the server 115 may transmit the usage information or patterns to a remote device for storage.

A user may interact with and access data associated with one or more facilities, such as one or more of the fixtures 107 therein (for example, the usage information or patterns determined by the server 115). The user device 120 may be used by an end user, such as a facility entity, to monitor and manage a facility (a single restroom or multiple restrooms in a building), one or more fixtures 107 of a facility, or a combination thereof. For example, a user may access and interact with the data determined by the server 115 to view and understand usage patterns, which may allow a facility entity or maintainer insights into, for example, how to optimize cleaning and maintenance schedules, whether there is a need for additional facilities, end point devices, or a combination thereof. For example, to communicate with the server 115 (i.e., the usage information or patterns determined by the server 115), the user device 120 may store a browser application or a dedicated software application executable by an electronic processor for interacting with the server 115.

Figure 6:
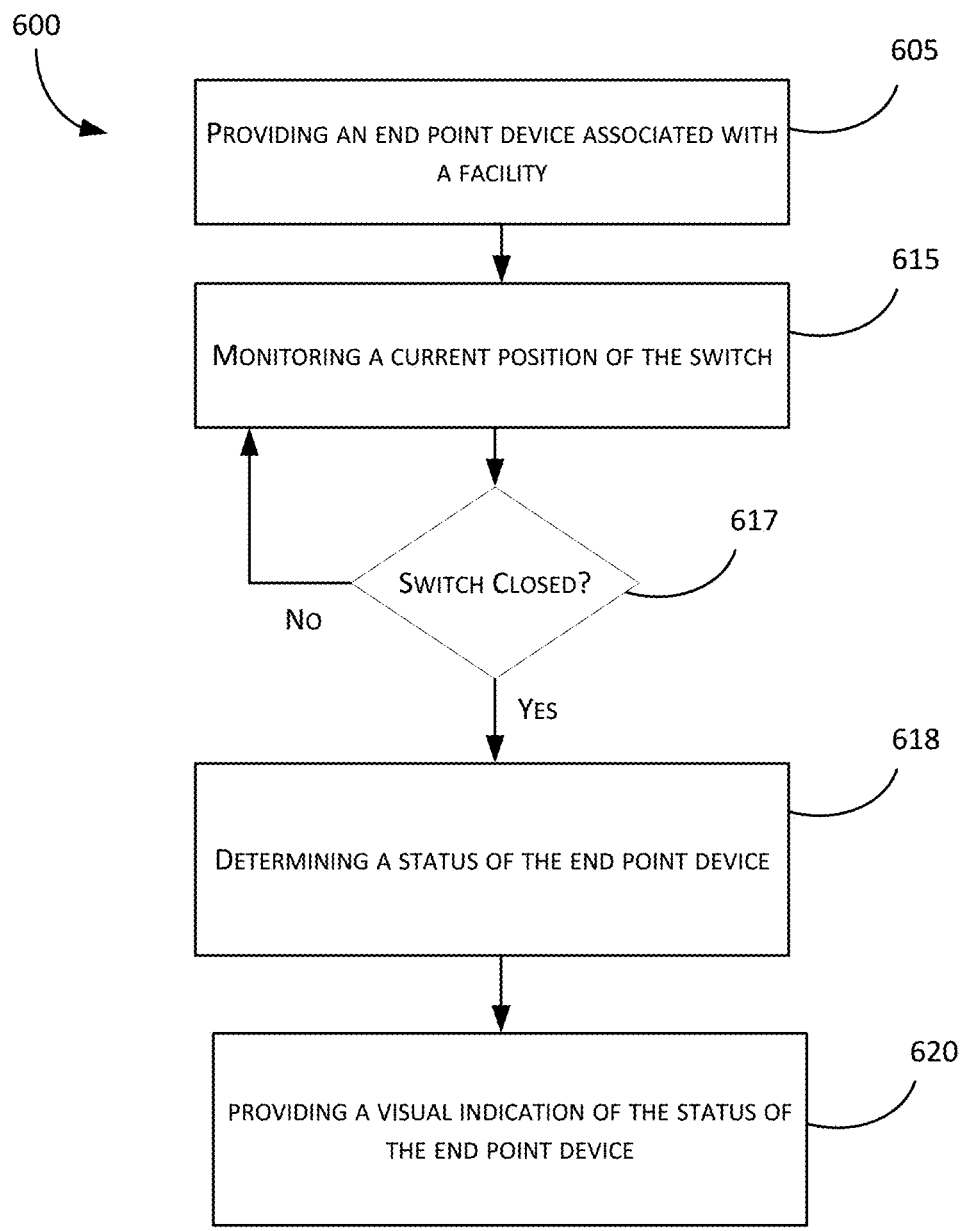
FIG. 6 is a flowchart illustrating a method for providing a status of a battery powered end point device using the system of FIG. 1 according to some embodiments.

FIG. 6 is a flowchart illustrating a method 600 for providing a status of a battery powered end point device (for example, the end point device 105) according to some embodiments. As seen in FIG. 6, the method 600 includes providing the end point device 105 associated with a facility (at block 605). As noted above, in some embodiments, the end point device 105 is provided or mounted to a pre-existing installation of a fixture 107. However, in other embodiments, the end point device 105 is provided to or mounted to the fixture 107 prior to or during installation of the fixture 107 within a facility. As one example, the electronic housing 400 of FIGS. 4A-4B is provided or mounted to the fixture 107.

The electronic processor 200 monitors a current position of the switch 225 (at block 615). As described above, the switch 225 may be in a depressed position or a non-depressed position (based on whether the boss 420 is currently depressing the switch 225). Accordingly, the electronic processor 200 may determine the current position of the switch 225 as "opened" or "depressed" when the switch 225 is depressed by the boss 420 (for example, when the housing 400 is in a closed position). Similarly, the electronic processor 200 may determine the current position of the switch 225 as "closed" or "non-depressed" when the switch 225 is not depressed by the boss 420 (for example, when the housing 400 is in an opened position).

As seen in FIG. 6, when the electronic processor 200 determines that the current position of the switch 225 is "opened" or "depressed" (No at block 617), the electronic processor 200 continues to monitor the current position of the switch 225 (returns to block 615). However, when the electronic processor 200 determines that the current position of the switch 225 is "non-depressed" (Yes at block 617), the electronic processor 200 continues to block 618.

In response to determining that the current position of the switch 225 is "non-depressed" or "closed" (at step 615), the electronic processor 200 determines a status of the end point device 105 (at block 618) and provides a visual indication of the status of the end point device 105 (at block 620). As noted above, a status of the end point device 105 may include, for example, a connection status, an operational status, or another status associated with a component of the system 100 (for example, the end point device 105). Accordingly, in some embodiments, the status may indicate whether the end point device 105 is connected to a wireless network (as a connection status). As one example, the status may indicate whether the end point device 105 is connected to the facility device 110. Alternatively or in addition, in some embodiments, the status may indicate an operational status (such as a health status or communication status) associated with the battery powered end point device, the fixture 107, or another component of the system 100.

In some embodiments, the electronic processor 200 provides the visual indication by generating and transmitting one or more control signals to one or more of the visual indicators 215. In response to receiving the one or more control signals, one or more of the visual indicators 215 may display a color associated with the status. As one example, a visual indicator 215 may display a first color (for example, green) when the end point device 105 is connected to, for example, a wireless network. As another example, a visual indicator 215 may display a second color (for example, red) when the end point device 105 is not connected to, for example, a wireless network. Alternatively or in addition, the visual indicator 215 may not display a color (for example, not illuminate) when the end point device 105 is not connected to, for example, a wireless network. Accordingly, in such embodiments, the absence of a displayed color indicates the status of the end point device 105. However, when the end point device 105 is connected to, for example, a wireless network, the visual indicator 215 may display a color.

It should be understood that in some embodiments, the electronic processor 200 is configured to continuously determine or monitor the status of the end point device 105. However, in such embodiments, the electronic processor 200 only provides the visual indication of the status in response to the switch 225 being in a "closed" or "non-depressed" position.

In some embodiments, the electronic processor 200 provides more than one visual indication based on a status of the end point device 105. As one example, the electronic processor 200 may provide a first visual indication of a connection status (for example, by controlling a first visual indicator 215) and provide a second visual indication of an operational status (for example, by controlling a second visual indicator 215). Accordingly, in such embodiments, the electronic processor 200 controls a set of visual indicators (for example, a first visual indicator, a second visual indicator, a third visual indicator, and the like) such that a complete status of one or more components of the system 100 (for example, the fixture 107, the end point device 105, and the like) may be indicated to a user via the set of visual indicators.

In some embodiments, the electronic processor 200 provides an audible alert, a visual alert, another type of alert, or a combination thereof based on a status (or connection status) of the end point device 105. In some embodiments, the electronic processor 200 may control an audible alert mechanism of the end point device 105 (not shown). As one example, the end point device 105 may include a buzzer (or other type of mechanism for generating an audible alert). In such embodiments, the electronic processor 200 provides an audible indication by generating and transmitting one or more control signals to the buzzer. In some embodiments, the electronic processor 200 controls the buzzer based on a duration of the connection status for the end point device 105. As one example, the electronic processor 200 may determine that the end point device 105 has not been connected to, for example, a wireless network for a duration exceeding a predetermined time period (for example, one hour, 24 hours, or the like). In response to the duration exceeding the predetermined time period, the electronic processor 200 may control the buzzer to provide an audible alert.

In some embodiments, the electronic processor 200 provides an audible alert and a visual alert. As one example, the electronic processor 200 may control the visual indicator 215 to provide a visual indication (for example, a red color) when the end point device 105 is not connected to, for example, a wireless network. After a predetermined time period in which the end point device 105 is still not connected to, for example, the wireless network, the electronic processor 200 may control the buzzer to provide an audible indication. Alternatively or in addition, after a predetermined time period in which the end point device 105 is still not connected to, for example, the wireless network, the electronic processor 200 may control the buzzer to provide the audible indication and control the visual indicator 215 to provide a visual indication (for example, a flashing red color). Accordingly, in some embodiments, the electronic processor 200 provides an audible alert, a visual alert, another type of alert, or a combination thereof based on a status (or connection status) of the end point device 105.

In some embodiments, the electronic processor 200 transmits status data to a remote device, such as the server 115. Status data may include for example, data associated with a connection status, an operational status, another type of status associated with a component of the system 100, or a combination thereof. For example, the status data may include a status, a duration of the status, a timestamp of the status (for example, a start time of the status), additional information associated with the status, and the like. As one example, the status data may include a "connected" status (as the connection status), a duration of 5 hours (as a duration of the status), and a start time of 10:00 am (as a timestamp). As noted above, the electronic processor 200 may transmit the status data to the server 115. In response to receiving the status data, the server 115 may process the status data. Based on the status data, the server 115 may determine status information, patterns, or trends associated with one or more components of the system 100. The server 115 may store the status information, patterns, or trends in, for example, a memory of the server 115. Alternatively or in addition, the server 115 may transmit the status information, patterns, or trends to a remote device for storage. Similar to the usage information or patterns (as described above), a user may interact with and access the status information, patterns, or trends via, for example, the user device 120.

In some embodiments, the server 115 may generate one or more alerts or notifications based on the status data. The alert or notification may include information associated with the status data, such as a status, a component associated with the status (for example, a particular end point device), a location of the component associated with the status, additional information associated with the status (for example, a duration of the status, a timestamp of the status, a severity of the status, and the like), or a combination thereof. In some embodiments, the server 115 may compare the status data to one or more thresholds, predetermined time periods, or a combination thereof. As one example, in response to determining that a "disconnect" status of an end point device 105 has exceeded 1 hour (as a predetermined time period), the server 115 may generate an alert or notification. In some embodiments, the server 115 may generate the alert or notification within a portal associated with the server 115 (such as a web portal). However, in other embodiments, the server 115 may generate and transmit the alert or notification to another device, such as the user device 120. As one example, the server 115 may generate and transmit an alert or notification for display to a user via a display device of the user device 120. As another example, the server 115 may generate and transmit an alert or notification for display to a user via a mobile communication device (for example, a cellphone of a facility manager or maintenance personnel).

Thus, the embodiments provide, among other things, to methods and systems for providing a status of a battery powered end point device. Various features and advantages of certain embodiments are set forth in the following claims.

What is claimed is:

1. A battery-powered end point device associated with a facility, the battery-powered end point device comprising:
    a housing including a receiving portion and a lid portion;
    a battery positioned within the receiving portion;
    a switch positioned on an inner surface of the receiving portion and configured to form a closed circuit when in a non-depressed position, and an open circuit when in a depressed position, wherein the switch is biased to the non-depressed position;
    a boss protruding from an inner surface of the lid portion and aligned with the switch such that the boss depresses the switch to the depressed position when the housing is closed; and
    an electronic processor powered by the battery and communicatively coupled to the switch, the electronic processor configured to:
    receive fixture data from a sensor of a plumbing fixture;
    enable transmission of the fixture data to a facility device, a server, or a user device; and
    when the closed circuit is formed:
        determine a status of the battery-powered end point device, and
        provide a visual indication of the status of the battery-powered end point device.

2. The battery-powered end point device of claim 1, wherein the status of the battery-powered end point device is a connection status of the battery-powered end point device to a wireless network.

3. The battery-powered end point device of claim 1, further comprising:
    a set of visual indicators, wherein the electronic processor is further configured to provide the visual indication of the status of the battery-powered end point device by providing one or more control signals to the set of visual indicators.

4. The battery-powered end point device of claim 3, wherein the set of visual indicators includes at least one light-emitting diode (LED) light.

5. The battery-powered end point device of claim 3, wherein, in response to receiving the one or more control signals, at least one visual indicator of the set of visual indicators indicates the status of the battery-powered end point device by displaying a color.

6. The battery-powered end point device of claim 1, wherein the visual indication indicates that the battery-powered end point device is connected to a wireless network.

7. The battery-powered end point device of claim 1, wherein the visual indication indicates that the battery-powered end point device is not connected to a wireless network.

8. system comprising:
    a battery-powered end point device associated with a facility, the battery-powered end point device including:
        a housing including a receiving portion and a lid portion,
        a battery positioned within the receiving portion;
        a switch positioned on an inner surface of the receiving portion and configured to form a closed circuit when in a non-depressed position, and an open circuit when in a depressed position, wherein the switch is biased to the non-depressed position;
        a boss protruding from an inner surface of the lid portion and aligned with the switch such that the boss depresses the switch to the depressed position when the housing is closed, and
        an electronic processor powered by the battery and communicatively coupled to the switch, the electronic processor configured to:
        receive fixture data from a sensor of a plumbing fixture;
        enable transmission of the fixture data to a facility device, a server, or a user device; and
        when the closed circuit is formed:
            determine a status of the battery-powered end point device, and
            provide a visual indication of the status of the battery-powered end point device.

9. The system of claim 8, wherein the status of the battery-powered end point device is a connection status of the battery-powered end point device to a wireless network.

10. The system of claim 8, wherein the battery-powered end point device further comprises a set of visual indicators, and wherein the electronic processor is further configured to provide the visual indication of the status of the battery-powered end point device by providing one or more control signals to the set of visual indicators.

11. The system of claim 10, wherein the set of visual indicators includes at least one light-emitting diode (LED) light.

12. The system of claim 10, wherein, in response to receiving the one or more control signals, at least one visual indicator of the set of visual indicators indicates the status of the battery-powered end point device by displaying a color.

* * * * *